United States Patent [19]

Tholen

[11] 4,303,101
[45] Dec. 1, 1981

[54] END PLUG ASSEMBLY FOR SEWER PIPE

[76] Inventor: James W. Tholen, 638 11th Ave. S., Hopkins, Minn. 55343

[21] Appl. No.: 139,808

[22] Filed: Apr. 14, 1980

[51] Int. Cl.³ .............................................. F16L 55/10
[52] U.S. Cl. .................................... 138/89; 138/96 R; 220/237
[58] Field of Search ...................... 138/89, 96 R, 96 T; 220/234, 237; 4/295

[56] References Cited

U.S. PATENT DOCUMENTS

| | | | |
|---|---|---|---|
| 1,674,998 | 6/1928 | Spang | 138/96 T |
| 2,479,862 | 8/1949 | Payne | 4/295 |
| 2,773,619 | 12/1956 | Moeller | 220/237 |
| 3,074,579 | 1/1963 | Miller | 138/96 T |
| 3,291,156 | 12/1966 | Corsano | 138/89 |
| 3,494,504 | 2/1970 | Jackson | 220/237 |
| 3,749,131 | 7/1973 | Burger | 138/89 |
| 3,901,167 | 8/1975 | Reese | 138/89 X |
| 4,170,247 | 10/1979 | Bates et al. | 138/89 |

Primary Examiner—James E. Bryant, III
Attorney, Agent, or Firm—Leo Gregory

[57] ABSTRACT

A reusable plug assembly to seal the end of a sewer pipe against gas and water leakage used when the sewer pipe has no useable threads or is not threaded at an open end and in which the plug assembly consists of an overlying end seal bearing against the end of the sewer pipe and having a sleeve extending into the sewer pipe, the sleeve having a flared end portion and a wedge member to expand the flared end portion into a line sealing engagement with the adjacent internal wall of the sewer pipe and an external member simultaneously compressing the end seal against the end of the pipe and drawing the wedge member into the flared end portion of the sleeve to expand it into sealing engagement with the pipe, and the plug assembly being sealed against any leakage between its parts.

7 Claims, 4 Drawing Figures

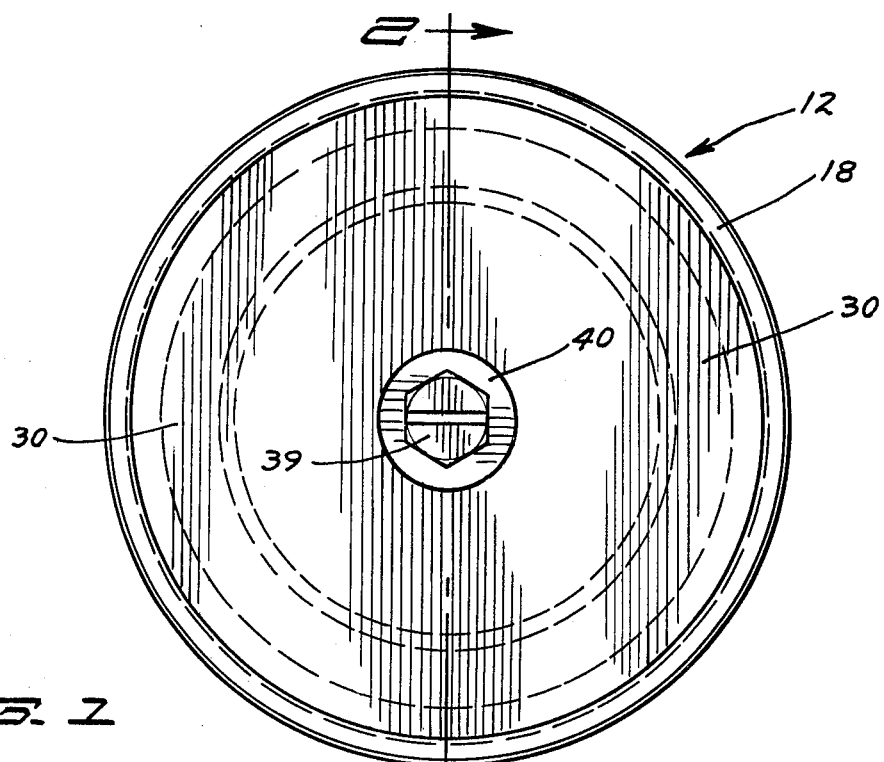
FIG. 1
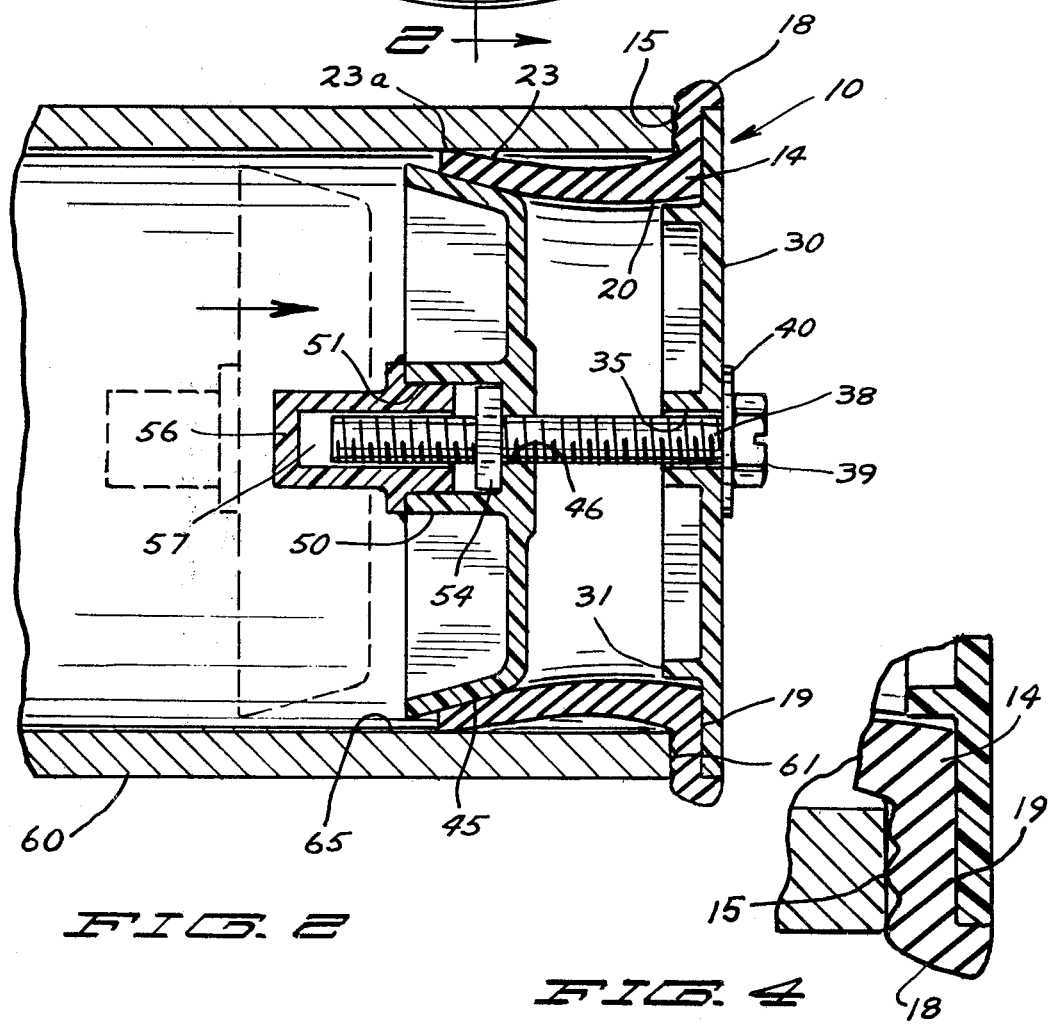
FIG. 2
FIG. 4

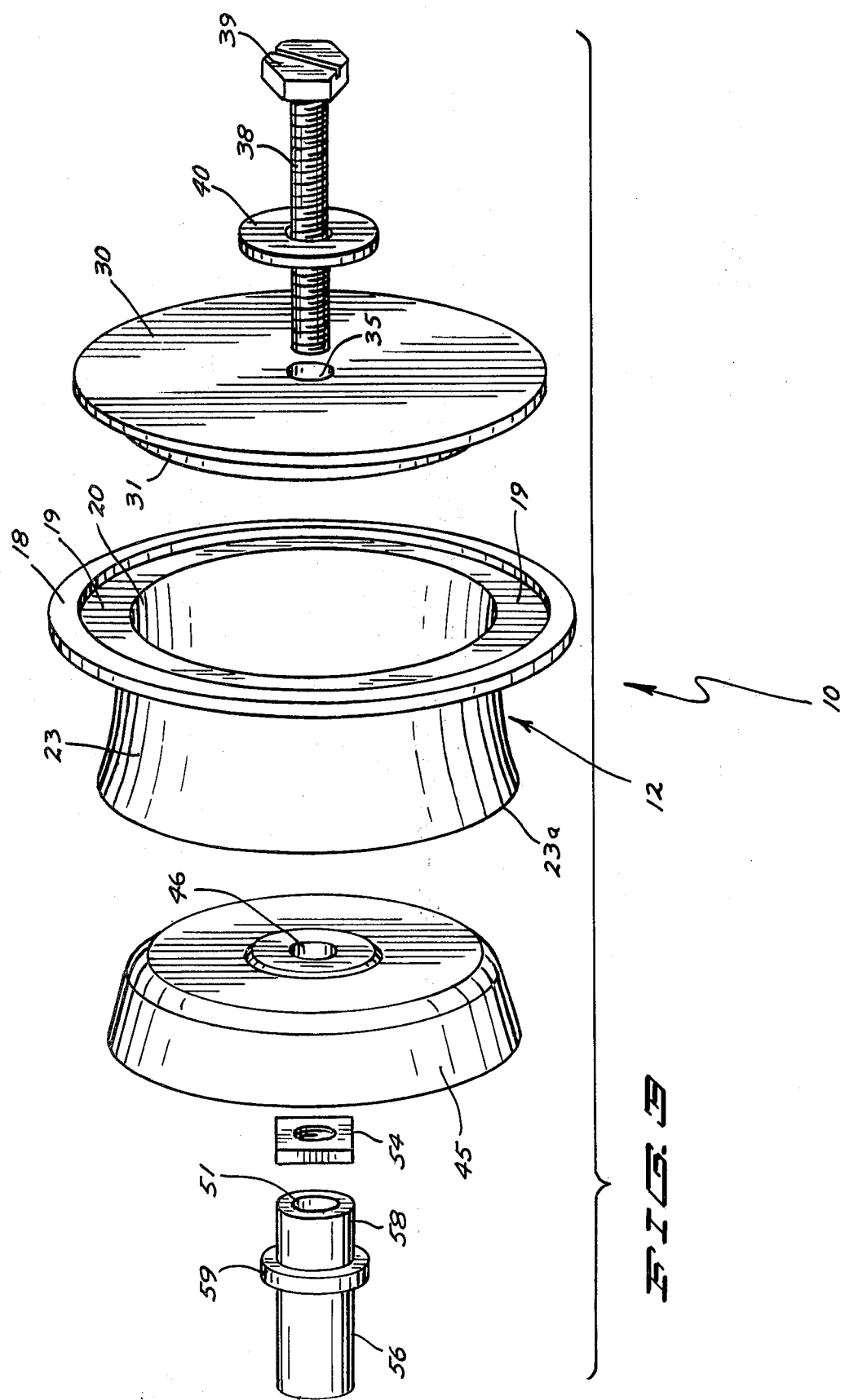

END PLUG ASSEMBLY FOR SEWER PIPE

BACKGROUND OF THE INVENTION

1. Field of the Invention

This invention relates to a reusable plug assembly for a sewer pipe.

2. Description of the Prior Art

Representative of the prior art are the structures of U.S. Pat. Nos. 2,155,491 and 3,749,131 in which internal plugs are deformed under linear compression to seal against the inner wall of a pipe to form a seal. The deformation of a plug member under linear compression does not insure sealing engagement with the inner wall of a pipe which may have irregularities formed in the surface thereof and the arrangement of the assemblies does not insure against leakage between the related parts thereof.

SUMMARY OF THE INVENTION

The invention herein relates to reusable plug assembly for the end of a sewer pipe which has no threads or no useable threads, to form an effective seal to prevent gas and water leakage and the assembly is of such construction as to insure against leakage between the assembled parts thereof.

It is an object of the invention herein to provide an end plug assembly for the open end of a sewer pipe comprising an external end sealing member to bear against the end wall portion of pipe and having a sleeve with a flared inner end portion extend inwardly of the pipe and a wedge expanding said flared portion against the internal surface of the pipe and external means to simultaneously compress said end seal member and draw said wedge into said sleeve for sealing engagement with said pipe and the assembled parts being sealed to insure against leakage therebetween.

More specifically stated, it is an object of this invention to provide an end plug assembly to seal the end of a pipe, the assembly comprising an external end plate seal member bearing against the end portion of the pipe and having an inwardly extending sleeve having a flared end portion arranged and constructed to have a line engagement with the internal surface of the pipe and a wedge member to be drawn inwardly of said sleeve and an external screw member drawing said wedge into said sleeve and compressing said plate seal against said end of said pipe to provide a simultaneous sealing engagement with the internal surface of said pipe and with the end portion of said pipe and said screw member and said wedge having a leakproof interengagement.

The above and other objects and advantages of the invention will be set forth in the following description made in connection with the accompanying drawings in which like reference characters refer to similar parts through the several views thereof.

BRIEF DESCRIPTION OF THE DRAWINGS

FIG. 1 is a view in end elevation showing some portions in dotted line;

FIG. 2 is a broken view in vertical section taken on line 2—2 of FIG. 1 as indicated;

FIG. 3 is an expanded view in perspective; and

FIG. 4 is a fragmentary view showing a detail of structure on an enlarged scale with reference to FIG. 2.

DESCRIPTION OF A PREFERRED EMBODIMENT

Referring to FIG. 3 of the drawings, an exploded view in perspective is shown of the structure herein comprising an end plug assembly for a sewer pipe, the same being indicated generally by the reference number 10.

Said end plug assembly comprises a seal member 12 substantially sleeve-like or tubular in form having one end portion thereof formed as an annular laterally projecting rim 14 in the form of a flange, the same having an underlying surface portion 15 forming a seal comprising rib-like projections therefrom substantially semi-circular in cross section to overlie and seal the end wall of a pipe to be described.

Said rim portion has a peripheral upstanding wall 18 forming recessed shoulder 19. A bore 20 extends through said member 12.

Said seal member 12 has its other end portion 23 flared as shown with the outer edge 23a of said flared portion adapted to form a seal by a line engagement.

Seated upon said shoulder 19 flush with said wall 18 is a rigid disc member 30 having a depending circular portion 31 seating within the bore 20. Said disc member is apertured centrally at 35 to receive a bolt 38 therethrough, said bolt having a slotted head 39 and shown disposed thereon is a washer 40.

Constructed to be received within said flared end portion 23 is a wedge member 45 frusto-conical in form having an aperture 46 therethrough to receive said bolt. Said wedge member as here shown in FIG. 2 is preferably cup shaped and has a central rearward projecting hub portion 50 which is recessed to have a cylindrical open ended chamber 51 into which a nut 54 is anchored, said nut being positioned to have said bolt 38 threaded therethrough.

A cylindrical cap member 56 is provided having a bore 57 extending inwardly of the end portion 58 thereof and having a collar 59 thereabout. Said end portion 58 is adapted to be received within said chamber 51 and together with said collar 59 is sealed to said wedge member as by the use of a suitable adhesive to become integral with said wedge member. Said cap member 56 provides a sealed chamber to receive the portion of the bolt 38 which is threaded through the nut 54.

FIG. 2 shows an end portion 60 of a sewer pipe and shown installed therein is the plug assembly 10 in operating position.

To place said plug assembly 10 in an operating position the disc member 31 is seated within the rim 14 upon said shoulder 19 and the bolt member 38 is extended therethrough to engage the nut 54. At this point, although engaged by the bolt 38, the wedge member 45 is rearwardly of and not seated within the flared sleeve portion 23. The diameter of the sleeve 12 is such as to be readily disposed within said pipe 60. The plug assembly is next disposed within said pipe and the flange 14 is seated upon the end wall 61 with the seal members 15 engaging said end wall.

The bolt member 38 will be further threaded through the nut 54 with the free end thereof being received within said bore 57 of said cap member 56. Said bolt in being threaded through said nut 54 draws the wedge member 45 inwardly of the adjacent flared end portion 23 of said sleeve 12 to expand said flared end portion to the point that its peripheral line portion 23a engages the adjacent inner surface 65 of the pipe 60. The threading of said bolt 38 simultaneously draws said wedge 45 into its operating position within the flared end portion 23 of the sleeve 12 and compresses the flange portion 14 with its underlying rib portion 15 into a sealing engagement against the end wall 61 of end pipe 60. Thus there is a positive seal by line engagement of the portion 23a with the adjacent inner surface of the pipe 60 and the sealing members 15 have a positive sealing engagement with the outer end wall of pipe 60. With the inner threaded end portion of the bolt 38 being received within the sealed chamber 57, the structure insures against leakage through the plug assembly.

The structure as described has been tested and found to positively seal the end portion of a sewer pipe against the leakage of existing gas and water pressures.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

I claim:

1. A plug assembly to seal the open end of a sewer pipe, having in combination
    a seal member disposed within the open end of a sewer pipe comprising,
    a rim portion forming an annular flange having underlying rib-like sealing projections,
    a sleeve integral at one end portion with said rim portion, and
    a flared end portion forming the other end portion of said sleeve,
    a rigid disc member disposed upon said rim portion,
    a bolt being received within said disc
    a wedge member drawn into the flared end portion of said sleeve,
    said wedge member having thread means therein receiving said bolt and being drawn by said bolt into said flared end portion of said sleeve expanding the same for sealing engagement with the adjacent inner surface of said pipe and simultaneously causing said disc to compress said rim portion into sealing engagement with the adjacent end wall of said pipe, and
    said wedge member having a sealed chamber to receive the end portion of said bolt threaded thereinto.

2. The structure of claim 1, wherein
    the outer edge portion of said flared end portion is arranged and constructed to make a line sealing engagement with the adjacent wall surface of said pipe.

3. A plug assembly to seal the open end of a sewer pipe, having in combination
    a seal member comprising
    a rim portion comprising a plurality of sealing ribs forming an annular flange to overlie the end wall of an open end of a sewer pipe,
    a sleeve integral at one end with said rim portion,
    a flared end portion forming the other end portion of said sleeve,
    a rigid disc member disposed upon said rim portion,
    a bolt being received within said disc,
    a wedge member engaged by said bolt and drawn thereby into said flared end portion to cause said flared end portion to expand and have a sealing engagement with the adjacent surface portion of said pipe, and
    said bolt causes said disc to compress said rim portion into sealing engagement with said end wall of said pipe.

4. The structure set forth in claim 3, wherein
    a peripheral wall portion extends about said rim portion.

5. The structure set forth in claim 3, wherein
    a cap member having a chamber therein has a sealed engagement with said wedge member to receive the end portion of said bolt threaded into said wedge member.

6. The structure set forth in claim 3, wherein
    said flared end portion when expanded by said wedge member has its peripheral outer edge portion arranged and constructed to have a line sealing engagement with the adjacent surface of said pipe.

7. The structure set forth in claim 3, wherein
    a nut is secured within said wedge member to receive said bolt.

* * * * *